(12) United States Patent
Wada

(10) Patent No.: US 8,040,770 B2
(45) Date of Patent: Oct. 18, 2011

(54) RECORDING METHOD AND OPTICAL DISC APPARATUS

(75) Inventor: Yasuhiro Wada, Osaka (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 247 days.

(21) Appl. No.: 12/273,105

(22) Filed: Nov. 18, 2008

(65) Prior Publication Data

US 2009/0141601 A1 Jun. 4, 2009

(30) Foreign Application Priority Data

Nov. 29, 2007 (JP) .................................. 2007-308185

(51) Int. Cl.
*G11B 7/004* (2006.01)
(52) U.S. Cl. ...................... 369/47.53; 369/59.12; 369/94
(58) Field of Classification Search ................. 369/47.5, 369/47.51, 47.53, 59.11, 59.12, 116, 94
See application file for complete search history.

(56) References Cited

U.S. PATENT DOCUMENTS

| | | | | |
|---|---|---|---|---|
| 7,339,865 | B2* | 3/2008 | Lee et al. ..................... | 369/47.53 |
| 7,345,973 | B2* | 3/2008 | Martens et al. ............. | 369/47.53 |
| 7,675,831 | B2* | 3/2010 | Minemura ................. | 369/59.11 |
| 2003/0043714 | A1* | 3/2003 | Takeda ........................ | 369/47.53 |
| 2003/0185121 | A1* | 10/2003 | Narumi et al. ............. | 369/47.53 |
| 2006/0062113 | A1* | 3/2006 | Watabe ........................ | 369/47.5 |
| 2006/0126462 | A1 | 6/2006 | Nakao et al. | |
| 2007/0025223 | A1* | 2/2007 | Ushiyama ................... | 369/59.12 |
| 2008/0013424 | A1* | 1/2008 | Cho et al. .................... | 369/47.53 |
| 2008/0101209 | A1* | 5/2008 | Nagai et al. .................... | 369/283 |

FOREIGN PATENT DOCUMENTS

| | | |
|---|---|---|
| CN | 1815572 A | 8/2006 |
| JP | 2005-259257 | 9/2005 |
| JP | 3720624 | 9/2005 |
| JP | 2007-164954 | 6/2007 |
| WO | WO 2005/031718 A1 | 4/2005 |

OTHER PUBLICATIONS

Chinese Office Action, w/ English translation thereof, issued in Chinese Patent Application No. CN 200810179070.2 dated May 10, 2010.

* cited by examiner

*Primary Examiner* — Wayne Young
*Assistant Examiner* — Thomas Alunkal
(74) *Attorney, Agent, or Firm* — McDermott Will & Emery LLP

(57) ABSTRACT

A recording power adjustment process to adjust a recording power is carried out in each recording layer of a multilayered optical disc, and a shift test writing process to adjust the pulse condition of a recording pulse is carried out only with regard to some of the respective recording layers. Then, based on the processing result of the recording power adjustment process and the processing result of the shift test writing process, a processing result of the shift test writing process in each of the recording layers, to which the shift test writing process has not been performed, is predicted. Then, information is recorded on a corresponding recording layer of the multilayered optical disc while adjusting the pulse condition of the recording pulse based on the processing result of the shift test writing process or the prediction result.

6 Claims, 6 Drawing Sheets

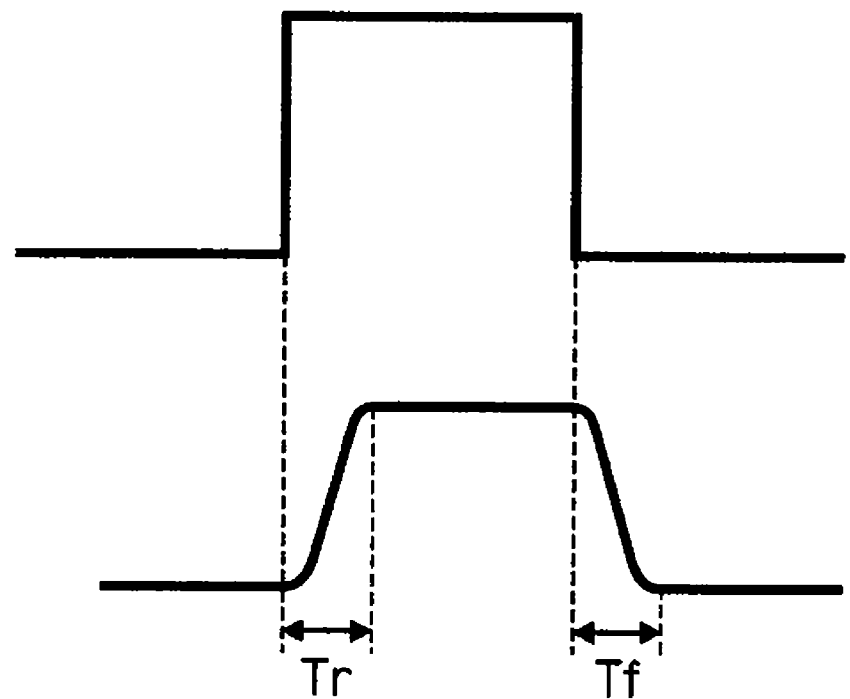

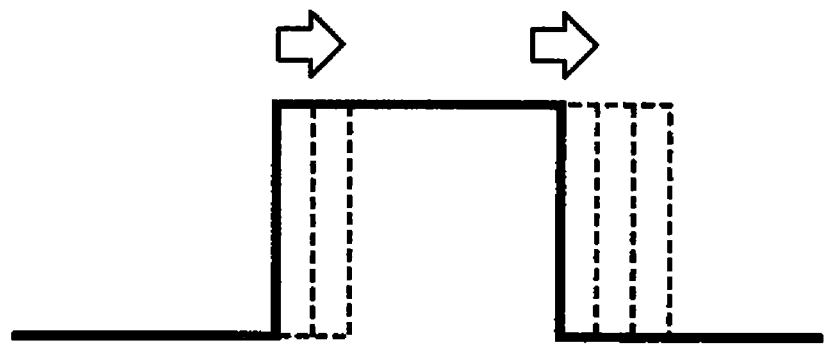
FIG.4A
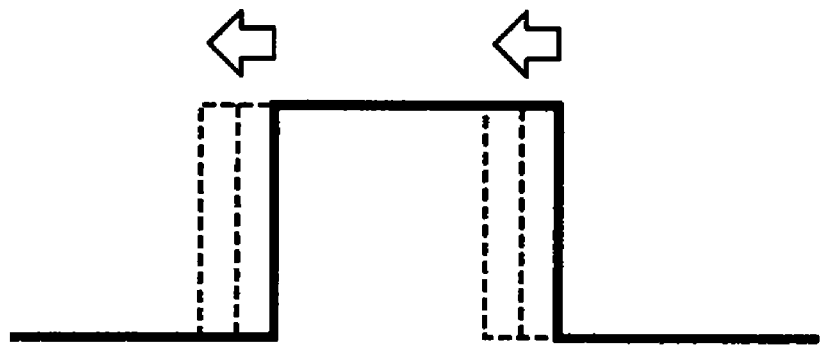
FIG.4B
FIG.5
|  | OPTIMUM RECORDING POWER |
|---|---|
| L0 | 12mW |
| L1 | 11mW |
| L2 | 10mW |
| L3 | 9mW |

FIG.6

| | REDUCED POWER | INCREASED POWER |
|---|---|---|
| RISING EDGE (Tr) | −X | +X |
| FALLING EDGE (Tf) | +X | −X |

FIG.7

| | OPTIMUM RECORDING POWER [mW] | RISING EDGE SHIFT CONDITION [T/32] | FALLING EDGE SHIFT CONDITION [T/32] |
|---|---|---|---|
| L0 | 12 | −2 | 0 |
| L1 | 11 | −2 | 0 |
| L2 | 10 | −3 | +1 |
| L3 | 9 | −3 | +1 |

30A, 30B, 30C, 30

RECORDING METHOD AND OPTICAL DISC APPARATUS

INCORPORATION BY REFERENCE

The present application claims priority from Japanese application JP2007-308185 filed on Nov. 29, 2007, the content of which is hereby incorporated by reference into this application.

BACKGROUND OF THE INVENTION

The present invention relates to a recording method and an optical disc apparatus. In particular, the present invention is suitably applied to an optical disc apparatus corresponding to a multilayered optical disc having a plurality of recording layers provided therein.

Conventionally, in the optical disc apparatus, an adjustment process of the recording power (recording power adjustment process) called OPC (Optimum Power Calibration) has been carried out in recording data on an optical disc. In the OPC, a test writing of predetermined data is carried out to a test writing area provided in the innermost periphery or the outermost periphery of an optical disc, and then the most suitable recording power (hereinafter, referred to as the optimum recording power) is detected based on a reproduced waveform of this test written data.

However, since such OPC is carried out prior to starting the data recording, it cannot respond to a change in the optimum recording power associated with the environmental change after starting the recording or a change of the recording position on an optical disc. Then, as a recording power control method corresponding to such a change in the optimum recording power, a method called Walking OPC has been proposed in recent years.

The Walking OPC is a method, in which at certain intervals or at regular time intervals, the recording is interrupted to reproduce a recording trailer and evaluate the data recording quality in this recording trailer and then the recording power is corrected based on this evaluation result. The recording power control based on such Walking OPC has been widely used in recent years because it can secure a high recording quality to ensure reproduction compatibility.

In such Walking OPC, a parameter called a β value indicative of the asymmetry of amplitude is used as an index of the recording quality. Then, in the Walking OPC, a correction factor for the recording power is calculated based on a predetermined β value to be targeted (hereinafter, suitably referred to as a target β value) and a β value obtained by reproducing the recording trailer at certain intervals or at regular time intervals (hereinafter, suitably referred to as a measured β value), and then based on this correction factor the recording power is corrected.

The techniques on the OPC are disclosed in JP Patent No. 3720624, WO 2005/031718, JP-A-2007-164954, and JP-A-2005-259257.

SUMMARY OF THE INVENTION

Incidentally, in recent years, the pulse width of a laser beam emitted in a pulse form from an optical pickup has been narrowed significantly with an increase in capacity of the optical disc. For this reason, in order to suppress the generation of jitter in recording information on such an optical disc, a process for detecting the optimum recording pulse called a "shift test writing" is required.

In such a shift test writing process, a recording mark having a predetermined length (e.g., 2T or 4T) is test-written multiple times onto such a test writing area while shifting the rising edge or the falling edge of a recording pulse little by little in the direction to reduce the pulse width or in the direction to increase the pulse width, and then the shift direction and the shift amount (hereinafter, referred to as the optimum pulse condition) of the rising edge or the falling edge of the recording pulse, with which a reproduction signal having the smallest jitter has been obtained, are detected.

In this case, in the shift test writing, the jitter of a reproduction signal is measured by test writing a plurality of recording marks as described above, so it takes more time (e.g., in the order of 10 seconds) as compared with the OPC which can be carried out in the order of one second per layer, for example. Moreover, in the case where the optical disc is a multilayered optical disc, since the OPC and the shift test writing need to be carried out in each recording layer, respectively, it will take further more time as compared with an optical disc having one recording layer.

In addition, in recent years, an optical disc apparatus, which is configured so as to carry out the OPC and the shift test writing in both test writing areas provided in the innermost periphery and the outermost periphery of an optical disc, has also come on the market. In such an optical disc apparatus, if the loaded optical disc is a multilayered optical disc, the OPC and the shift test writing will take time no less than double the time required for an ordinary multilayered optical disc, including a seek time from the test writing area of the innermost periphery to the test writing area of the outermost periphery or from the test writing area of the innermost periphery to the test writing area of the innermost periphery.

This might result in a timeout on a host computer side until such an optical disc apparatus returns a write ready response after receiving a write request from the host computer. Moreover, when it takes a lot of time in the write preparation this way, a user might have a considerable feeling of discomfort.

The present invention has bee made in view of the above-described problems and intends to propose a recording method and an optical disc apparatus capable of dramatically reducing the write preparation time.

In order to solve such problems, in the present invention, a recording method for recording information on a multilayered optical disc having a plurality of recording layers, comprises: a first step of performing a recording power adjustment process to adjust the recording power in each of the recording layers of the multilayered optical disc and also performing a shift test writing process to adjust the pulse condition of a recording pulse with regard to only some of the recording layers; a second step of predicting, based on a processing result of the recording power adjustment process and a processing result of the shift test writing process, a processing result of the shift test writing process in each of the recording layers to which the shift test writing process has not been performed; and a third step of recording the information on the recording layer of the multilayered optical disc while adjusting the pulse condition of the recording pulse based on the processing result of the shift test writing process or the prediction result.

Moreover, in the present invention, an optical disc apparatus for recording information on a multilayered optical disc having a plurality of recording layers, comprises: a recording/reproducing unit which records information on the corresponding recording layer of the multilayered optical disc or reproduces the information recorded on the corresponding recording layer; and a controller for controlling the recording/reproducing unit, wherein the controller performs a recording power adjustment process to adjust a recording power in each of the recording layers of the multilayered optical disc by controlling the recording/reproducing unit, and also performs a shift test writing process to adjust the pulse condition of a recording pulse with regard to only some of the recording layers; and further the controller predicts, based on a processing result of the recording power adjustment process and a processing result of the shift test writing process, a processing result of the shift test writing process in each of the recording layers to which the shift test writing process has not been performed, and further records the information on the corresponding recording layer of the multilayered optical disc while adjusting the pulse condition of the recording pulse based on a processing result of the shift test writing process or a prediction result.

According to the present invention, the write preparation time can be reduced dramatically since the shift test writing process is carried out only in some of the recording layers. As such, a recording method and an optical disc apparatus can be realized, which, until a host computer receives a write ready response from an optical disc apparatus after issuing a write request, can prevent beforehand and effectively a timeout from occurring in the host computer or a user from having a feeling of discomfort.

BRIEF DESCRIPTION OF THE DRAWINGS

FIGS. 2A and 2B are waveform charts for illustrating a rise time and a fall time of a recording pulse.

FIG. 3 is a table showing a relationship between the light emission power of a laser diode and the rise time and the fall time of a recording pulse.

FIGS. 4A and 4B are conceptual diagrams provided for description of a method of predicting the optimum pulse condition of other recording layer from the optimum pulse condition of a specific recording layer.

FIG. 5 is a table provided for description of a method of predicting the optimum pulse condition of other recording layer from the optimum pulse condition of a specific recording layer.

FIG. 6 is a table provided for description of a method of predicting the optimum pulse condition of other recording layer from the optimum pulse condition of a specific recording layer.

FIG. 7 is a conceptual diagram showing a control table of the optimum recording power and the optimum pulse condition.

DETAILED DESCRIPTION OF THE INVENTION

Hereinafter, embodiments of the present invention will be described in conjunction with the accompanying drawings.

(1) Configuration of an Optical Disc Apparatus According to this Embodiment

Figure 1:
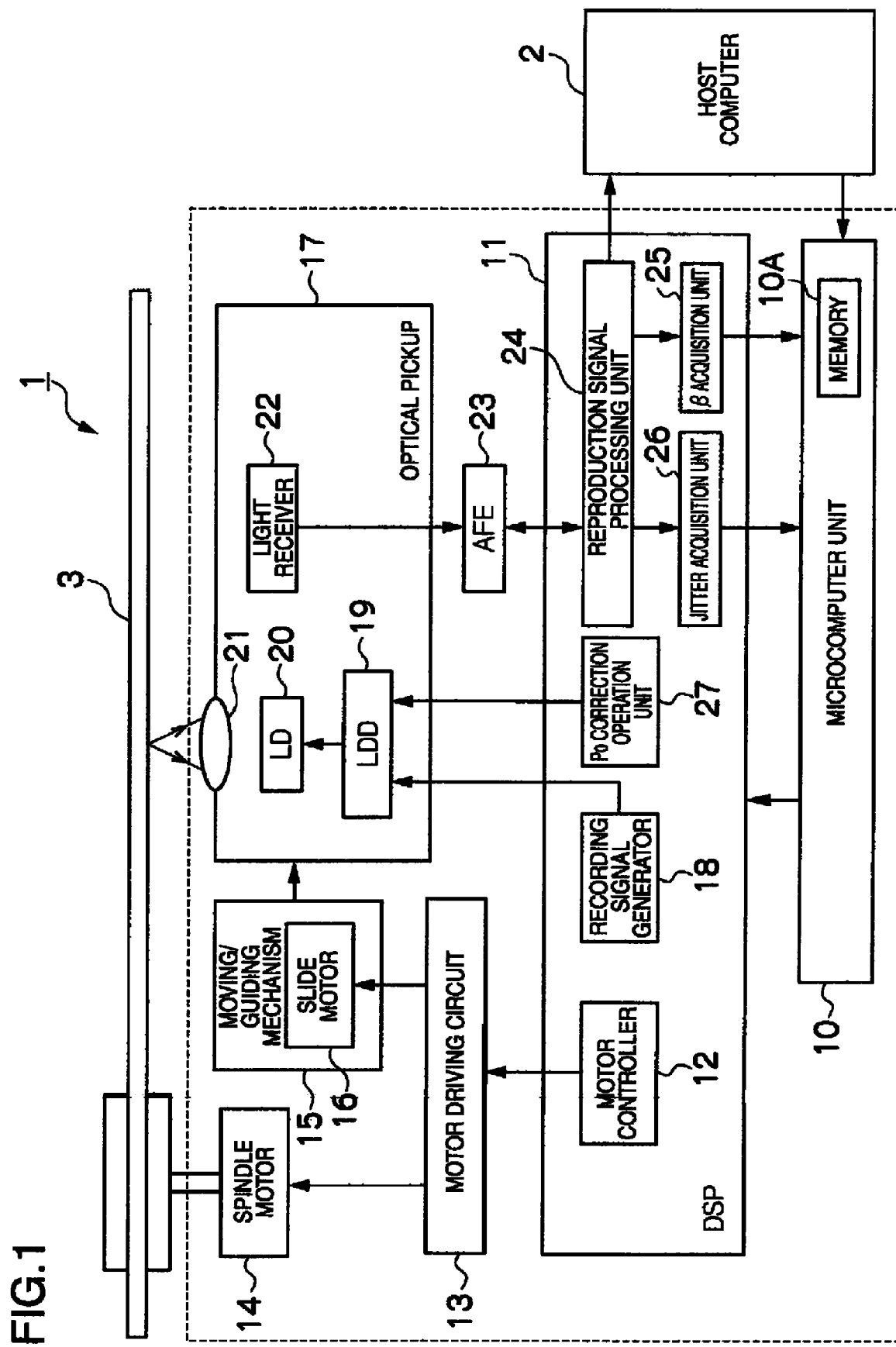
FIG. 1 is a block diagram showing a schematic configuration of an optical disc apparatus according to this embodiment.

In FIG. 1, reference numeral 1 generally represents an optical disc apparatus according to this embodiment. The optical disc apparatus 1 corresponds to a multilayered optical disc, and is configured to be able to record data on a multilayered optical disc 3 or to reproduce the data recorded on the multilayered optical disc 3 in response to a request from a host computer 2.

Actually, in the case of the optical disc apparatus 1, various kinds of commands sent from the host computer 2 are input to a microcomputer unit 10. The microcomputer unit 10 comprises a CPU (Central Processing Unit) and a memory 10A in which various kinds of control programs are stored, and performs necessary control processings or arithmetic processings based on commands provided from the host computer 2 or various kinds of information provided from a digital signal processor (DSP: Digital Signal Processor) 11 inside the optical disc apparatus 1.

For example, if given a record command from the host computer 2, the microcomputer unit 10 drives a spindle motor 14 via a motor controller 12 inside the digital signal processor 11 and a motor driving circuit 13 and thereby rotates the multilayered optical disc 3, which is loaded in a predetermined state, at a rotation condition corresponding to the recording method (e.g., a CLV (Constant Linear Velocity) method, a CAV (Constant Angular Velocity) method, or the like).

Moreover, the microcomputer unit 10 drives, when needed, a slide motor 16 of a moving/guiding mechanism 15 via the motor controller 12 inside the digital signal processor 11 and the motor driving circuit 13 and thereby moves an optical pickup 17 in the radial direction of the multilayered optical disc 3.

On the other hand, the digital signal processor 11 carries out, in a recording signal generator 18, predetermined signal processings, such as a modulation processing, to data to be recorded, the data being provided via the microcomputer unit 10 from the host computer 2, and then sends the thus obtained recording signal to a laser diode driving circuit 19 inside the optical pickup 17.

Then, the laser diode driving circuit 19 blinkingly drives a laser diode 20 by applying to this laser diode a pulsed driving signal which has been strategy-controlled based on a supplied recording signal. Moreover, in this case, a non-illustrated dual shaft actuator holding an objective lens 21 places the objective lens 21 at a predetermined position relative to the multilayered optical disc 3 under control of the microcomputer unit 10.

As a result, a laser beam which blinks in a pattern corresponding to the data to be recorded is emitted from the laser diode 20, and this laser beam is focused on a recording layer to be targeted at this time of the multilayered optical disc 3 through the objective lens 21. As a result, this data to be recorded is recorded on the multilayered optical disc 3.

The reflected light of this laser beam in a recording layer of the multilayered optical disc 3 is focused on a light receiver 22 inside the optical pickup 17 through the objective lens 21. The light receiver 22 comprises, for example, a quadrant photodetector and the like, and sends to an analog front end (AFE) 23 an RF (Radio Frequency) signal of an analog waveform obtained by photoelectrically converting the incident reflected light.

The analog front end 23 carries out a predetermined analog processing, such as amplification or waveform-shaping processing, to the supplied RF signal, and then sends the thus obtained RF signal of a digital waveform to a reproduction signal processing unit 24 of the digital signal processor 11.

The reproduction signal processing unit 24 carries out a predetermined signal processing, such as a demodulation processing, to the supplied RF signal, and produces various kinds of servo signals, such as a focus error signal and a tracking error signal, based on the thus obtained demodulated signal. In this way, the dual shaft actuator inside the optical pickup 17 is controlled based on these focus error signal and tracking error signal, thereby carrying out focus control or tracking control.

Furthermore, a part of the laser beam emitted from the laser diode 20 inside the optical pickup 16 is photoelectrically converted by a non-illustrated light receiver used for APC (Auto Power Control) inside the optical pickup 16. Then, a recording-power monitor signal obtained by this photoelectric conversion is converted into digital in the analog front end 23, and is then provided to the recording signal generator 18 of the digital signal processor 11 as the digital recording-power monitor signal.

In this way, the recording signal generator 18 controls, based on this digital recording-power monitor signal, the signal level of a recording signal to be sent to the laser diode driving circuit 19 so that the recording power may become a predetermined recording power to be targeted (hereinafter, referred to as a target recording power), (APC control).

On the other hand, if given a reproduce command from the host computer 2, the microcomputer unit 10, as in the above-described case where given the record command, rotates the multilayered optical disc 3 at a rotation condition corresponding to the recording method thereof. Moreover, the microcomputer unit 10 controls the recording signal generator 18 of the digital signal processor 11 to send a predetermined driving signal to the laser drive circuit 19 inside the optical pickup 17.

The laser driving circuit 19 lighting-drives the laser diode 20 at a predetermined voltage based on the supplied driving signal. As a result, a laser beam of a predetermined power is emitted from the laser diode 20, and this laser beam is focused on a recording layer to be targeted at this time of the multilayered optical disc 3 through the objective lens 21.

The reflected light in the multilayered optical disc 3 of this laser beam is photoelectrically converted by the light receiver 22 inside the optical pickup 17, and then the thus obtained RF signal of an analog waveform is converted into an RF signal of a digital waveform in the analog front end 23 in a similar manner described above, and is then provided to the reproduction signal processing unit 24 of the digital signal processor 11.

The reproduction signal processing unit 24 carries out a reproduction signal processing, such as a demodulation processing, to the supplied RF signal, and then sends the thus obtained reproduction signal to the host computer 2. Moreover, the reproduction signal processing unit 24, as in the case where given the record command, generates servo signals, such as a focus error signal and a tracking error signal, based on such reproduction signal. In this way, the focus control, the tracking control, and the like are carried out based on these focus error signal and tracking error signal in a similar manner at the time of recording data.

Note that, in the case of the optical disc apparatus 1 according to this embodiment, the Walking OPC is carried out in recording data on the multilayered optical disc 3.

Actually, in recording data on the multilayered optical disc 3, the microcomputer unit 10 controls the digital signal processor 11, or the slide motor 16 of the moving/guiding mechanism 15 and the laser diode driving circuit 19 of the optical pickup 17 via the digital signal processor 11, thereby interrupting the recording at certain intervals or at certain time intervals and reproducing the record trailer. Then, a reproduction signal obtained at this time is provided to a β acquisition unit 25 and a jitter acquisition unit 26 from the reproduction signal processing unit 24 of the digital signal processor 11.

The β acquisition unit 25 measures the maximum level a1 and the minimum level a2 of the supplied reproduction signal, and then based on these maximum level a1 and minimum level a2 the arithmetic operation given by Equation (1) is carried out.

$$\beta = (a1+a2)/(a1-a2) \qquad (1)$$

Then, the β acquisition unit 25 sends the measured β value obtained by this arithmetic operation to the microcomputer unit 10.

The microcomputer unit 10 compares the supplied measured β value with a predetermined target β value, and sends a control signal corresponding to the comparison result to a recording power correction operation unit 27 of the digital signal processor 11. Then, by controlling the laser diode driving circuit 19 of the optical pickup 17 based on the supplied comparison result, the recording power correction operation unit 27 corrects the recording power so that the measured β value may approach the target β value.

Moreover, the jitter acquisition unit 26 measures the value of jitter of the supplied reproduction signal (hereinafter, simply referred to as a jitter value) using a TIA (Time Interval Analyzer) function, for example, and sends this measurement result to the microcomputer unit 10. Then, this measurement result is used in a recording pulse condition control processing according to the present embodiment described later.

(2) Recording Pulse Condition Control Processing According to the Present Embodiment Next, the recording pulse condition control processing according to the present embodiment is described.

Generally, when a pulsed driving voltage as shown in FIG. 2A is applied to a laser diode, as shown in FIG. 2B it takes a certain amount of time (hereinafter, referred to as a rise time) Tr for the light-emitting power of the laser diode to reach a power corresponding to a voltage value of the driving voltage, and then it takes a certain amount of time (hereinafter, referred to as a fall time) Tf for this light-emitting power to return to the original power after the driving voltage has fallen.

The applicant of the present invention has found out that in this case, as shown in FIG. 3, when the light-emitting power of the laser diode is low, the rise time Tr becomes small and the fall time Tf becomes large, while when the light-emitting power is high, the rise time Tr becomes large and the fall time Tf becomes small.

Therefore, for example, if the optimum recording power of each recording layer in the multilayered optical disc 3 and the optimum pulse condition for suppressing jitter in one of the recording layers are known using such rise and fall characteristics of the light-emitting power of the laser diode, the optimum pulse condition of the recording pulse in other recording layer may be predicted.

Specifically, for a recording pulse used in a recording layer whose optimum recording power is smaller than a recording layer whose optimum pulse condition for suppressing jitter of the recording pulse is already known (hereinafter, referred to as a specific recording layer), it is anticipated that the rise time Tr becomes smaller and the fall time Tf becomes larger than the recording pulse used in the specific recording layer. Therefore, for such a recording layer, as shown in FIG. 4A, relative to the optimum pulse condition of the specific recording layer, the rising edge of the recording pulse may be further shifted in the direction to reduce the pulse width and also the falling edge may be further shifted in the direction to increase the pulse width of the recording pulse, thereby obtaining the optimum recording pulse that causes a small jitter in the reproduction signal.

Moreover, it is anticipated that a recording pulse used in a recording layer, whose optimum recording power obtained by OPC is smaller than the specific recording layer, will have a larger rise time Tr and a smaller fall time Tf than the recording pulse used in the specific recording layer. Therefore, for such a recording layer, as shown in FIG. 4B, relative to the optimum pulse condition of the specific recording layer, the rising edge of the recording pulse may be further shifted in the direction to increase the pulse width and also the falling edge may be further shifted in the direction to decrease the pulse width of the recording pulse, thereby obtaining the optimum recording pulse that causes a small jitter in the reproduction signal.

For example, as shown in FIG. 5, in a multilayered optical disc having four recording layers L0-L3, assume that the values of the optimum recording power obtained by OPC that has been performed in each of the recording layers L0-L3 are 12 [mW], 11 [mW], 10 [mW], and 9 [mW], respectively, and that the optimum pulse condition of the recording layer L1 has been obtained by shift test writing.

In this case, for the recording layer L0, the optimum recording power is larger than the optimum recording power of the recording layer L1, and therefore, in the optimum pulse condition of the recording layer L1 it is predicted that the rising edge of the recording pulse will shift in the direction to increase the pulse width than the optimum pulse condition of the recording layer L0, and that the falling edge of the recording pulse will shift in the direction to reduce the pulse width (see FIG. 4B). Moreover, the shift amount of the rising edge and the falling edge in this case can be predicted based on the optimum recording power of the recording layer L0 and the optimum recording power of the recording layer L1.

Similarly, for the recording layer L2 and the recording layer L3, the optimum recording power is smaller than the optimum recording power of the recording layer L1, and therefore, in the optimum pulse conditions of the recording layer L2 and the recording layer L3 it is predicted that the rising edge of the recording pulse will shift in the direction to decrease the pulse width than the optimum pulse condition of the recording layer L0 and that the falling edge of the recording pulse will shift in the direction to increase the pulse width (see FIG. 4A). Then, the shift amount of the rising edge and the falling edge in this case can be predicted based on the optimum recording power of the recording layer L0 and the optimum recording power of the recording layer L3 or the recording layer L3, respectively.

Based on the principle described above, in the optical disc apparatus 1 according to the present embodiment, the OPC is carried out to each recording layer of the multilayered optical disc 3, while the shift test writing is carried out only to a recording layer in which the recording is started. Then, in the optical disc apparatus 1, based on the optimum recording power of each recording layer obtained by such OPC and the optimum pulse condition of the recording pulse obtained by the shift test writing that has been carried out to a recording layer in which the recording is started, the processing result of the shift test writing for each of the other recording layers is predicted, respectively (i.e., the optimum pulse condition for each recording pulse is predicted, respectively).

Specifically, as shown in FIG. 6, with regard to the recording layer whose optimum recording power is lower than that of the specific recording layer to which the shift test writing has been carried out, relative to the optimum pulse condition of the specific recording layer, the rising edge of the recording pulse is shifted by a constant X in the direction to reduce the pulse width and also the falling edge of the recording pulse is shifted by the constant X in the direction to increase the pulse width, thereby predicting the optimum pulse condition.

Moreover, with regard to the recording layer whose optimum recording power is higher than the specific recording layer, relative to the recording pulse of the specific recording layer whose rising edge or falling edge has been shifted by the optimum shift amount relative to the optimum pulse condition of the specific recording layer, the rising edge is shifted by the constant X in the direction to reduce the pulse width and also the falling edge is shifted by the constant X in the direction to increase the pulse width, thereby predicting the optimum pulse condition.

Note that, in the case of the present embodiment, as such constant X, the value calculated by Equation (2) is used.

$$X=|W1-W2|/2 \text{ [mW]} \qquad (2)$$

, where W1 is the optimum recording power of the specific recording layer obtained by OPC, and W2 is the optimum recording power of a recording layer which is targeted when this optimum recording power is obtained by OPC.

Then, in the optical disc apparatus 1, after predicting the optimum pulse condition for each recording layer as described above, the rising edge and the falling edge of a recording pulse are shifted from the reference width so as to be in the predicted optimum pulse condition in each recording layer, and thereby the data recording is carried out.

However, since such prediction is not always correct, in the optical disc apparatus 1 the jitter of a reproduction signal is measured whenever the Walking OPC is carried out and if the value of the jitter exceeds a predefined threshold, the shift test writing is carried out in that recording layer to re-set the pulse condition (the shift directions and the shift amount of the rising edge and the falling edge) of the recording pulse.

As a means for carrying out such a recording pulse condition control processing, an optimum recording power and optimum pulse condition control table 30 as shown in FIG. 7 is provided in the internal memory 10A of the microcomputer unit 10.

The optimum recording power and optimum pulse condition control table 30 is a table for controlling the optimum pulse condition of a recording pulse for each recording layer that have been predicted based on the optimum recording power for each recording layer obtained by OPC, and the optimum pulse condition of a recording pulse obtained by carrying out the shift test writing to a recording layer in which the recording is started.

In the optimum recording power and optimum pulse condition control table 30, as shown in FIG. 7, an "optimum recording power" column 30A, a "rising edge shift amount" column 30B, and a "falling edge shift amount" column 30C are provided corresponding to each recording layer of the multilayered optical disc 3 that is loaded at that time.

Then, in each "optimum recording power" Column 30A, a recording power most suitable for a corresponding recording layer that has been measured by OPC, respectively, is stored, while in the "rising edge shift amount" column 30B, the shift direction ("+" or "−") and the shift amount of the rising edge of the recording pulse most suitable for a corresponding recording layer which have been determined by the actual shift test writing or have been predicted based on a result of the shift test writing are stored. Moreover, in the "falling edge shift amount" column 30C, the shift direction and the shift amount of the falling edge of the recording pulse most suitable for a corresponding recording layer which have been determined by the actual shift test writing or have been predicted based on a result of the shift test writing are stored.

Figure 8:
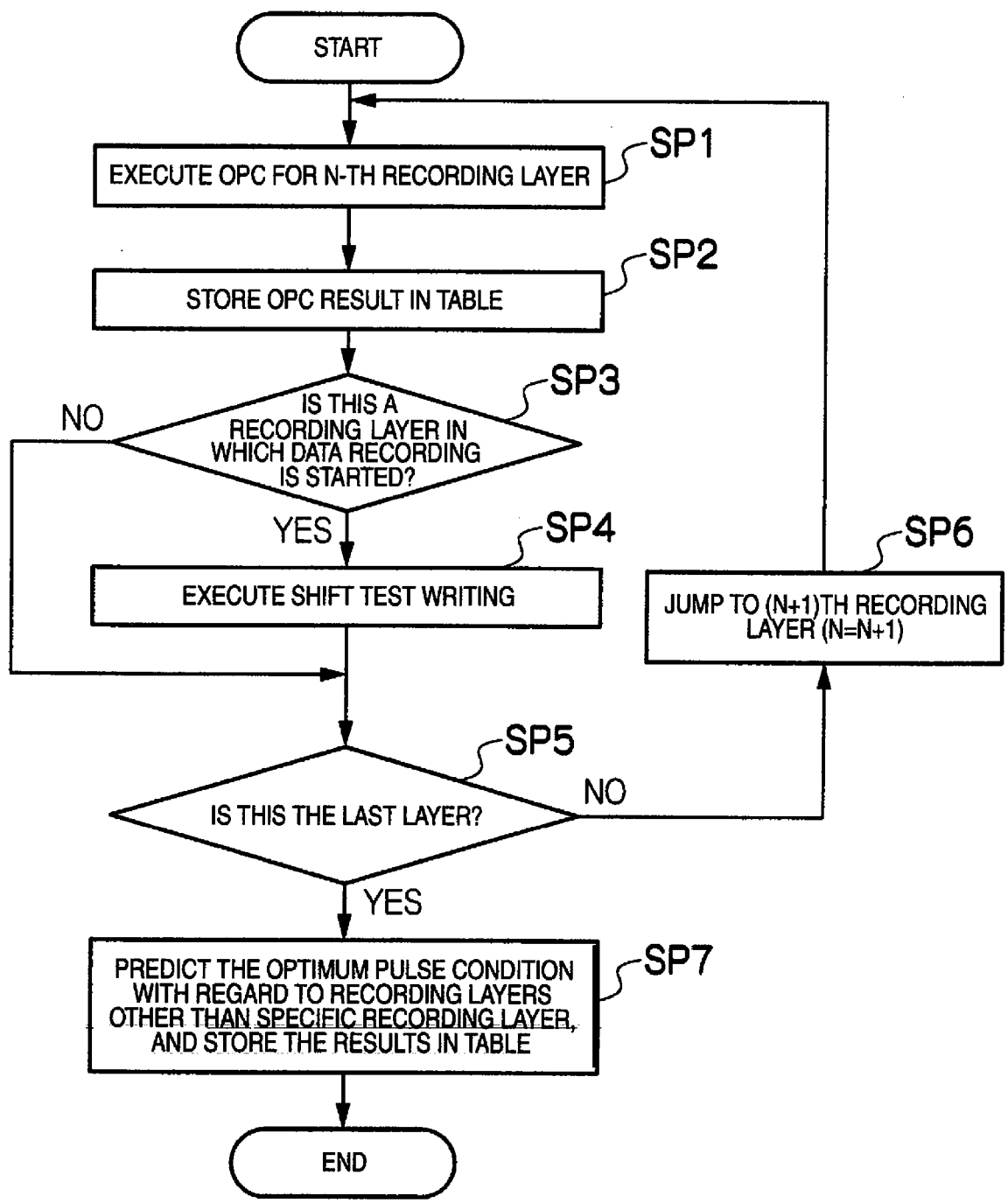
FIG. 8 is a flowchart provided for description of an OPC and a shift test writing process according to this embodiment.

FIG. 8 shows the specific processing contents of the microcomputer unit 10 with regard to the OPC and the shift test writing which are carried out in the optical disc apparatus 1 according to this embodiment. The microcomputer unit 10 carries out the OPC and the shift test writing process shown in FIG. 8 based on a control program stored in the memory 10A.

That is, after loading the multilayered optical disc 3 and completing the loading process, the microcomputer unit 10, if given a write request from the host computer 2, starts these OPC and shift test writing process, and then, first, carries out the OPC to the n-th recording layer after resetting n to zero. (SP1).

Subsequently, the microcomputer unit 10 stores the optimum recording power for the n-th recording layer obtained by such OPC into the corresponding "optimum recording power" column 30A of the optimum recording power and optimum pulse condition control table 30 (SP2).

Next, the microcomputer unit 10 determines, based on a write request that is received at that time, whether or not the n-th recording layer is a recording layer in which the data recording is started (SP3). Then, the microcomputer unit 10 will proceed to Step SP5 if it obtains a negative result in this determination.

In contrast, the microcomputer unit 10, if it obtains a positive result in this determination, controls the digital signal processor 11, and the motor driving circuit 13 and optical pickup 17 via the digital signal processor 11 to carry out the shift test writing in a test writing area provided in the innermost periphery or the outermost periphery of the n-th recording layer, and then stores the optimum shift directions and the shift amount of the rising edge and the falling edge of the recording pulse which have been obtained this time, into the corresponding "rising edge shift amount" column 30B and "falling edge shift amount" column 30C inside the optimum recording power and optimum pulse condition control table 30, respectively (SP4).

Subsequently, the microcomputer unit 10 determines whether or not the n-th recording layer is the last layer (SP5), and the microcomputer unit 10, if it obtains a negative result here, controls the dual shaft actuator inside the optical pickup 17 via the digital signal processor 11 to move the focus position of the objective lens 21, thereby moving the recording layer targeted by the OPC to the next (n+1)th recording layer (SP6). Moreover, subsequently, the microcomputer unit 10 returns to Step SP1, and processes Step SP1 and the subsequent Steps in the same manner as described above.

Then, if the microcomputer unit 10 obtains a positive result in Step SP5 after completing the OPC for all the recording layers of the loaded multilayered optical disc 3, then, it completes the OPC and the shift test writing process, and sends a write ready response to the host computer 2.

Figure 9:
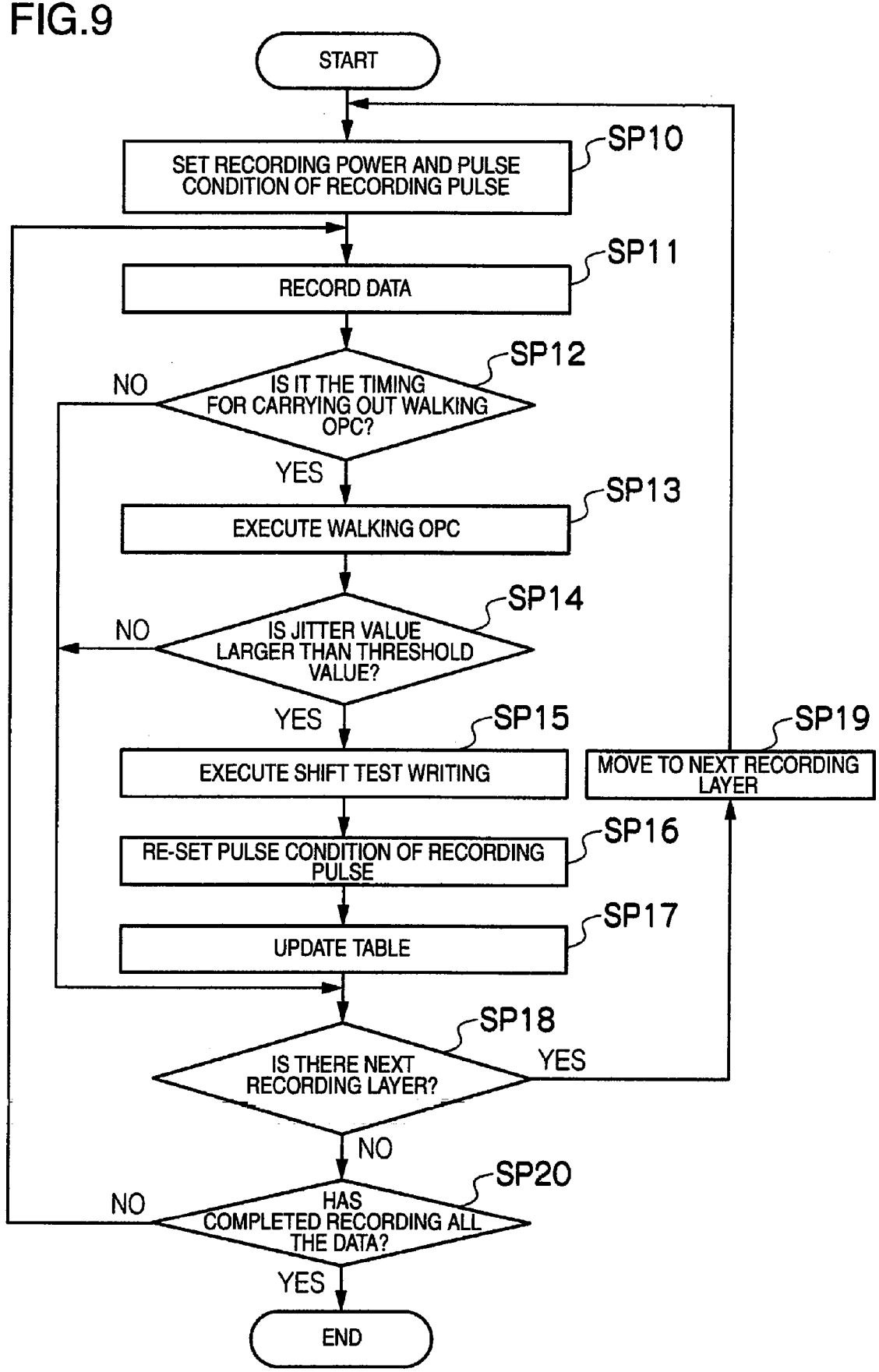
FIG. 9 is a flowchart provided for description of a write processing according to this embodiment.

On the other hand, the microcomputer unit 10, subsequently, if given the data to be recorded from the host computer 2 upon receipt of such a write ready response, will carry out a write processing shown in FIG. 9 in accordance with a control program stored in the memory 10A (FIG. 1).

That is, if given the data to be recorded from the host computer 2, the microcomputer unit 10 starts this write processing, and first reads the optimum recording power of a recording layer, in which the data recording is intended to be started at that time, and the optimum shift directions and the shift amount of the rising edge and the falling edge of the recording pulse from the optimum pulse condition control table 30. Then, the microcomputer unit 10 sets the read-out optimum recording power to the recording signal generator 18 inside the digital signal processor 11, as a target recording power of the APC control, and also sets the read-out optimum shift directions and the shift amount of the rising edge and the falling edge of the recording pulse to the recording signal generator 18 (SP10).

Subsequently, the microcomputer unit 10 controls the recording signal generator 18 of the digital signal processor 11, and the slide motor 16 (FIG. 1) of the moving/guiding mechanism 15 (FIG. 1) and the like via the digital signal processor 11 to record a predetermined amount of data to be recorded, the date being provided from the host computer 2, on the multilayered optical disc 3 (SP11).

Then, the microcomputer unit 10 subsequently determines whether or not it is the timing for carrying out the Walking OPC (SP12), and then the microcomputer unit 10, if it obtains a negative result here, determines whether or not it is necessary to move the recording layer to the next recording layer (SP18). Moreover, the microcomputer unit 10, if it obtains a negative result in this determination, will determine whether or not all the data provided from the host computer 2 have been recorded on the multilayered optical disc 3 (SP20).

The microcomputer unit 10, if it obtains a negative result in this determination, will return to Step SP11, and subsequently will repeat a loop of Step SP11, Step SP12, Step SP18, Step SP20, to Step SP11 until it obtains a positive result in Step SP12, Step SP18, or Step SP20.

Then, the microcomputer unit 10, if it soon obtains a positive result in Step SP12, will carry out the Walking OPC (SP13). Then, the microcomputer unit 10 determines whether or not the jitter value that is obtained in such walking OPC is larger than a predetermined threshold (SP14).

The microcomputer unit 10, if it obtains a negative result in this determination, will proceed to Step SP18, and in contrast, if it obtains a positive result in this determination, the microcomputer unit 10 will carry out the shift test writing to a recording layer to which the data recording is being carried out at this time (SP15).

Next, the microcomputer unit 10 re-sets the optimum pulse condition (the shift direction and the shift amount of the rising edge and the falling edge of the recording pulse) for this recording layer obtained by such shift test writing in the recording signal generator 18 of the digital signal processor 11 (SP16). Moreover, the microcomputer unit 10 re-predicts the optimum pulse condition for other recording layer based on the optimum pulse condition for this recording layer obtained by such shift test writing, and re-registers such re-set optimum pulse condition and re-predicted optimum pulse condition with the optimum recording power and optimum pulse condition control table 30 (SP17). Then, the microcomputer unit 10 proceeds to Step SP18.

In contrast, the microcomputer unit 10, if it obtains a positive result in Step SP18, moves the focus position of the objective lens 21 to the next recording layer by driving the dual shaft actuator inside the optical pickup 17 via the digital signal processor 11, for example, (SP19), and then returns to Step SP10. Then, the microcomputer unit 10 carries out the processings of Step SP10 and the subsequent Steps in a similar manner described above.

Then, the microcomputer unit 10 will terminate this write processing if it obtains a positive result in Step SP20 soon by completing the recording of all the data provided from the host computer 2 on the multilayered optical disc 3.

(3) Effects of the Present Embodiment

As described above, in the optical disc apparatus 1, the OPC is carried out to each recording layer of the multilayered optical disc 3, while the shift test writing is carried out only to a recording layer in which the recording is started. Then, based on the optimum recording power of each recording layer obtained by such OPC and the optimum pulse condition of the recording pulse obtained by the shift test writing that has been carried out to the recording layer in which the recording is started, the optimum pulse condition of the recording pulse for each of the other recording layers is predicted, respectively, and the pulse condition of the recording pulse for the relevant other recording layer is adjusted in accordance with this prediction result. Accordingly, the write preparation time can be dramatically reduced as compared with the case where the shift test writing is carried out to all the recording layers. In this way, an optical disc apparatus can be realized, which, until the host computer 2 receives a write ready response from the optical disc apparatus 1 after issuing a write request, can prevent beforehand and effectively a timeout from occurring in the host computer 2 or a user from having a feeling of discomfort.

Moreover, in the optical disc apparatus 1, the optimum pulse condition of the recording pulse of a laser beam for each recording layer, to which the shift test writing has not been carried out, of the multilayered optical disc 3 is predicted as described above, and then the jitter of the reproduction signal is always monitored even after the recording pulse of the laser beam has been controlled based on the prediction, and if there are a plenty of jitters in a certain recording layer, the shift test writing is carried out in this recording layer. Accordingly, a high quality reproduction signal can be always obtained while reducing the write preparation time.

(4) Other Embodiments

Note that, in the above-described embodiments, a case where the optical disc apparatus is configured as shown in FIG. 1 has been described, but the present invention is not limited thereto, and in addition to this, the present invention can be widely applied to optical disc apparatuses of various kinds of configurations.

Moreover, in the above-described embodiments, a case where the optimum pulse condition of a recording pulse in each recording layer is predicted using X given by Equation (2) based on the OPC result of each recording layer of the multilayered optical disc 3 has been described, but the present invention is not limited thereto, and various kinds of methods can be widely applied as the prediction method of the optimum pulse condition of the recording pulse in each recording layer.

Furthermore, in the above-described embodiments, a case where the optimum pulse condition of a recording pulse is calculated by separately predicting the shift direction and shift amount of the rising edge and the falling edge of a recording pulse, respectively, has been described, but the present invention is not limited thereto, and the optimum pulse condition may be calculated by predicting the shift direction and the shift amount of either one of the rising edge and the falling edge of a recording pulse, and the pulse width of the recording pulse, for example.

Furthermore, in the above-described embodiments, a case where the shift test writing is carried out only to a recording layer, in which the recording is started, of the multilayered optical disc 3 has been described, but the present invention is not limited thereto, and the recording layer in which such shift test writing is carried out is not limited to the recording layer in which the recording is started, and moreover, the number of recording layers in which the shift test writing is carried out is not limited to one layer. In short, the shift test writing may be carried out to only some of the recording layers of the multilayered optical disc 3, and thereby the write preparation time can be reduced.

Furthermore, in the above-described embodiments, a case has been described where a recording/reproducing unit, which records information on a corresponding recording layer of the multilayered optical disc 3 and reproduces the information recorded on the corresponding recording layer, is configured from the digital signal processor 11, the optical pickup 17, and the like formed as shown in FIG. 1, and the controller for controlling such recording/reproducing unit is configured from the microcomputer 10, but the present invention is not limited thereto, and various kinds of configurations can be widely applied as the configuration of these recording/reproducing unit and controller.

The invention claimed is:

1. A recording method for recording information on a multilayered optical disc having a plurality of recording layers, the method comprises:
   a first step of performing a recording power adjustment process to adjust a recording power in each of the recording layers of the multilayered optical disc and also performing a shift test writing process to adjust a pulse condition of a recording pulse with regard to only some of the recording layers;
   a second step of predicting, based on a processing result of the recording power adjustment process and a processing result of the shift test writing process, a processing result of a shift test writing process in each of the recording layers to which the shift test writing process has not been performed; and
   a third step of recording the information on at least one of the recording layers of the multilayered optical disc to which the shift test writing process has not been performed while adjusting the pulse condition of the recording pulse based on the processing result of the shift test writing process or a prediction result of the second step,
   wherein in the second step,
   a pulse condition of the recording pulse in each of the recording layers is predicted in such a manner that with regard to a recording layer having a smaller adjustment value of a recording power obtained by the recording power adjustment process than the recording layer to which the shift test writing process has been carried out, a rising edge of the recording pulse is shifted to a direction to reduce a pulse width of the recording pulse and also a falling edge of the recording pulse is shifted in a direction to increase a pulse width of the recording pulse, while with regard to a recording layer having a larger adjustment value of a recording power obtained by the recording power adjustment process than the recording layer to which the shift test writing process has been carried out, a rising edge of the recording pulse is shifted to a direction to increase the pulse width of the recording pulse and also the falling edge of the recording pulse is shifted in a direction to decrease a pulse width of the recording pulse.

2. The recording method according to claim 1, wherein in the second step, a shift direction and a shift amount of a rising edge and a falling edge of the recording pulse are separately predicted, respectively.

3. The recording method according to claim 1, wherein in the first step, the shift test writing process is carried out only with regard to the recording layer, in which recording is started, out of the recording layers.

4. The recording method according to claim 1, wherein in the third step, in recording the information on the multilayered optical disc, the information recorded on the multilayered optical disc is periodically reproduced and if a value of jitter of the reproduction signal becomes worse than a predetermined threshold, then the shift test writing process is carried out to the relevant recording layer, and based on the processing result of the shift test writing process a pulse condition of the recording pulse with respect to the relevant recording layer is re-set.

5. The recording method according to claim 4, wherein in the third step, based on the processing result of the shift test writing process with respect to the recording layer for which the pulse condition of the recording pulse has been re-set, a processing result of the shift test writing process with respect to the other recording layer is re-predicted.

6. An optical disc apparatus for recording information on a multilayered optical disc having a plurality of recording layers, comprising:

a recording/reproducing unit which records information on a corresponding recording layer of the multilayered optical disc and reproduces the information recorded on the corresponding recording layer; and a controller for controlling the recording/reproducing unit, wherein the controller performs a recording power adjustment process to adjust a recording power in each of the recording layers of the multilayered optical disc by controlling the recording/reproducing unit, and also performs a shift test writing process to adjust a pulse condition of a recording pulse with regard to only some of the recording layers; and the controller further predicts, based on a processing result of the recording power adjustment process and a processing result of the shift test writing process, a processing result of a shift test writing process in each of the recording layers to which the shift test writing process has not been performed; and the controller further records the information on a corresponding recording layer of the multilayered optical disc to which the shift test writing process has not been performed while adjusting a pulse condition of the recording pulse based on a processing result of the shift test writing process or a prediction result, when the controller further predicts, a pulse condition of the recording pulse in each of the recording layers is predicted in such a manner that with regard to a recording layer having a smaller adjustment value of a recording power obtained by the recording power adjustment process than the recording layer to which the shift test writing process has been carried out, a rising edge of the recording pulse is shifted to a direction to reduce a pulse width of the recording pulse and also a falling edge of the recording pulse is shifted in a direction to increase a pulse width of the recording pulse, while with regard to a recording layer having a larger adjustment value of a recording power obtained by the recording power adjustment process than the recording layer to which the shift test writing process has been carried out, a rising edge of the recording pulse is shifted to a direction to increase the pulse width of the recording pulse and also the falling edge of the recording pulse is shifted in a direction to decrease a pulse width of the recording pulse.

* * * * *